(12) United States Patent
Kobayashi

(10) Patent No.: US 11,836,541 B2
(45) Date of Patent: Dec. 5, 2023

(54) NOTIFICATION APPARATUS AND NON-TRANSITORY COMPUTER READABLE MEDIUM

(71) Applicant: FUJIFILM Business Innovation Corp., Tokyo (JP)

(72) Inventor: Kazuhide Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/030,342

(22) Filed: Sep. 23, 2020

(65) Prior Publication Data

US 2021/0232445 A1 Jul. 29, 2021

(30) Foreign Application Priority Data

Jan. 27, 2020 (JP) ................. 2020-010583

(51) Int. Cl.
*G06F 9/54* (2006.01)
*G06F 3/0482* (2013.01)
*G06F 9/451* (2018.01)

(52) U.S. Cl.
CPC ............ *G06F 9/542* (2013.01); *G06F 3/0482* (2013.01); *G06F 9/453* (2018.02)

(58) Field of Classification Search
None
See application file for complete search history.

(56) References Cited

U.S. PATENT DOCUMENTS

| | | | | |
|---|---|---|---|---|
| 6,021,403 A | * | 2/2000 | Horvitz | G06N 5/00 706/45 |
| 6,510,431 B1 | * | 1/2003 | Eichstaedt | H04L 67/63 709/224 |
| 9,992,342 B1 | * | 6/2018 | Yarnell | H04M 3/5183 |
| 2004/0073720 A1 | * | 4/2004 | Clough | H04L 41/044 710/15 |
| 2007/0156851 A1 | * | 7/2007 | Tasci | G06Q 10/10 709/219 |
| 2010/0070554 A1 | * | 3/2010 | Richardson | H04L 67/306 709/202 |
| 2014/0025441 A1 | * | 1/2014 | Eberlein | G06Q 10/06 705/7.39 |
| 2015/0281453 A1 | * | 10/2015 | Maturana | G06F 9/5072 379/265.12 |
| 2018/0150571 A1 | * | 5/2018 | Douglas | G06Q 10/06 |
| 2019/0066031 A1 | * | 2/2019 | Hancock | G06Q 50/2057 |
| 2019/0392049 A1 | * | 12/2019 | Estes | G06F 16/2379 |
| 2020/0097616 A1 | * | 3/2020 | Asur | G06F 40/295 |
| 2020/0410427 A1 | * | 12/2020 | Haze | G06Q 10/063112 |

FOREIGN PATENT DOCUMENTS

| | | |
|---|---|---|
| JP | 2001117940 | 4/2001 |
| JP | 2005266938 | 9/2005 |
| JP | 2007287046 | 11/2007 |

* cited by examiner

*Primary Examiner* — Charles E Anya
(74) *Attorney, Agent, or Firm* — JCIPRNET

(57) ABSTRACT

A notification apparatus includes memory and a processor. The processor is configured to: store history of user operations in the memory; and, in response to detection of a first operation that does not satisfy a condition, notify a first user who has performed the first operation of information on a second user who has performed a second operation satisfying the condition, based on the history stored in the memory.

18 Claims, 12 Drawing Sheets

FIG. 3

| User ID | User name | Department name | Contact address | Permit to provide information |
|---|---|---|---|---|
| U01 | Shinsei Taro | XXX department | ... | Yes |
| U02 | Shonin Jiro | XXX department | ... | No |
| U03 | YYY | XXX department | yyy@... | Yes |
| ... | ... | ... | ... | ... |

| Application Approval Processing System |
|---|

New application

Name of application (Free entry)
[ Transportation expenses application ] ~F1

Type of application
[ Travel and transportation expenses application ▼ ] ~F2

Date and time ~F3    Applicant ~F4
[ dd/MM/yyyy ]       [ Shinsei Taro ]

Application code    Cost code          PJ code
[ 123456 ]           [        ]         [        ]
         ~F5              ~F6                ~F7

Apply to/Approver
[        ] ~F8

FIG. 11

```
┌─────────────────────────────────────────────────────────────┐
│                Application Approval Processing System        │
├─────────────────────────────────────────────────────────────┤
│  New application                                             │
│    Name of application (Free entry)                          │
│    ┌──────────────────────────────────────┐                  │
│    │ Transportation expenses application  │                  │
│    └──────────────────────────────────────┘                  │
│    Type of application                                       │
│    ┌──────────────────────────────────────┬─┐                │
│    │ Travel and transportation expenses application │▼│      │
│    └──────────────────────────────────────┴─┘                │
│                                                              │
│    Date and time          Applicant                          │
│    ┌──────────────┐      ┌──────────────────┐                │
│    │ dd/MM/yyyy   │      │ Shinsei Taro     │                │
│    └──────────────┘      └──────────────────┘                │
│    Application code      Cost code         PJ code           │
│    ┌──────────────┐      ┌──────────────┐  ┌──────────────┐  │
│    │ 123456       │      │              │  │              │  │
│    └──────────────┘      └──────────────┘  └──────────────┘  │
│                          ┌────────────────────────────────┐  │
│    Apply to/Approver     │ Are you having trouble with    │  │
│    ┌──────────────┐      │ the cost code?                 │─M│
│    │              │      │ Recently YYY in the XXX        │  │
│    └──────────────┘      │ department has submitted an    │  │
│                          │ application with a similar name.│ │
│                          │ mail:yyy@*******.co.jp         │  │
│                          └────────────────────────────────┘  │
└─────────────────────────────────────────────────────────────┘
```

FIG. 12A

> Are you having trouble with the cost code?
> Let me introduce YYY belonging to the same XXX department as you.
>
> mail:yyy@*******.co.jp ~Ma

FIG. 12B

> Are you having trouble with the cost code?
> Previously YYY entered the following codes:
>
> 123-456
> 456-123

> Are you having trouble with the next process?
> It seems that, from the past execution history, the implementation content differs depending on the application content.
> Let me introduce operators with a shot input time.
>
> Long distance application: DDDD in AAA department
>
> Nearby application: EEEE in BBB department ~Mc

FIG. 12D

> Due to typos in the PJ code, applications have been frequently returned.
> Let me introduce a user whose applications have been returned only a few times.
>
> CCCC in AAA department ~Md

NOTIFICATION APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-010583 filed Jan. 27, 2020.

BACKGROUND

(i) Technical Field

The present disclosure relates to a notification apparatus and a non-transitory computer readable medium.

(ii) Related Art

There is a series of pieces of software used by a plurality of members in a company or the like when the members collaborate to perform a task. These pieces of software are also referred to as enterprise content management (ECM) software or the like. In general, these pieces of software are equipped with a help function for presenting an operation method or the like to a user who has become confused about operations.

By the way, these pieces of software may be customized for each company. When the operation method and to-be-input data are different for each company due to customization, it may be difficult for a user to learn the correct operation only with the general description provided by the help function.

To this end, if a user finds a matter that is not understandable with the general description, the user needs to actively search for the matter or a person related to the matter. Japanese Unexamined Patent Application Publication Nos. 2001-117940 and 2007-287046 describe technologies related to these searches.

SUMMARY

Aspects of non-limiting embodiments of the present disclosure relate to introducing, to a user who does not know what operation the user should do, a person who has knowledge about the operation (hereinafter may also be referred to as an expert).

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a notification apparatus including memory and a processor. The processor is configured to: store history of user operations in the memory; and, in response to detection of a first operation that does not satisfy a condition, notify a first user who has performed the first operation of information on a second user who has performed a second operation satisfying the condition, based on the history stored in the memory.

BRIEF DESCRIPTION OF THE DRAWINGS

An exemplary embodiment of the present disclosure will be described in detail based on the following figures, wherein:

FIG. 3 is a diagram illustrating an exemplary user database (DB);

FIG. 10 is a diagram illustrating an exemplary input form displayed on the terminal by ECM software;

FIG. 11 is a diagram illustrating an exemplary input form that gives notice of information on a second user;

FIGS. 12A to 12D are diagrams each illustrating an exemplary message area displayed on the input form;

DETAILED DESCRIPTION

Configuration of Information Processing System

Figure 1:
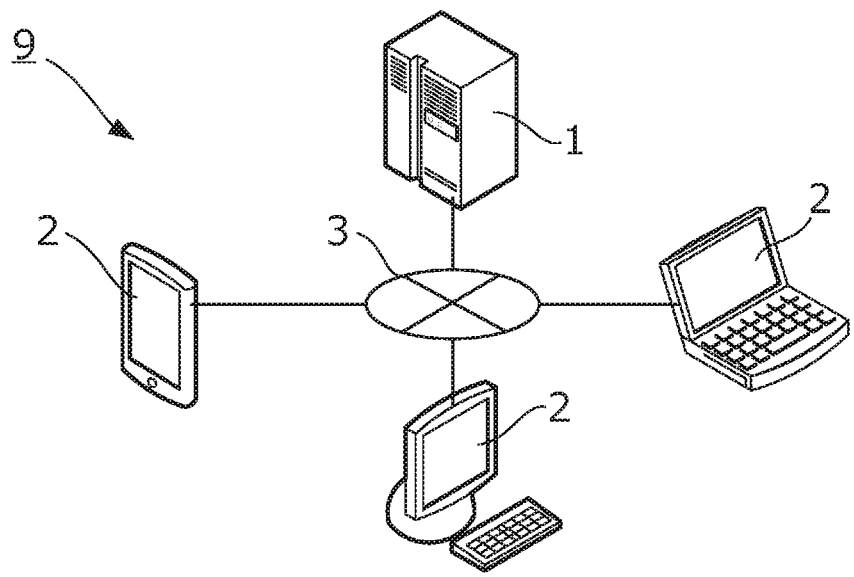
FIG. 1 is a diagram illustrating an exemplary overall configuration of an information processing system.

FIG. 1 is a diagram illustrating an exemplary overall configuration of an information processing system 9. The information processing system 9 is a system that notifies a user who does not know what operation the user should do (hereinafter referred to as a first user) of information on a user who has knowledge about the operation (hereinafter referred to as a second user). The information processing system 9 includes a notification apparatus 1, terminals 2, and a communication line 3, as illustrated in FIG. 1.

The terminals 2 are terminal respectively owned by users in the information processing system 9, and include, for example, a smartphone, a personal computer, and the like. The information processing system 9 illustrated in FIG. 1 includes the multiple terminals 2.

The notification apparatus 1 is an information processing apparatus that supports the execution of a task in an organization to which a plurality of members belong, such as a company, with the use of so-called ECM software, and that notifies a first user who does not know what operation the first user should do of information on a second user who is an expert. The notification apparatus 1 is, for example, a computer, and is a server apparatus that responds to a request from a terminal 2, which is a client apparatus.

The communication line 3 is a that connects the notification apparatus 1 and the terminals 2 so that they may be able to communicate with each other. The communication line 3 may be, for example, a local area network (LAN), a wide area network (WAN), the Internet, or a combination thereof. In addition, the communication line 3 may include the Public Switched Telephone Network (PSTN) or Integrated Services Digital Network (ISDN).

Note that the number of each of the notification apparatus 1, the terminals 2, and the communication line 3 in the information processing system 9 is not limited to that illustrated in FIG. 1, and may be one or plural.

Configuration of Information Processing Apparatus

Figure 2:
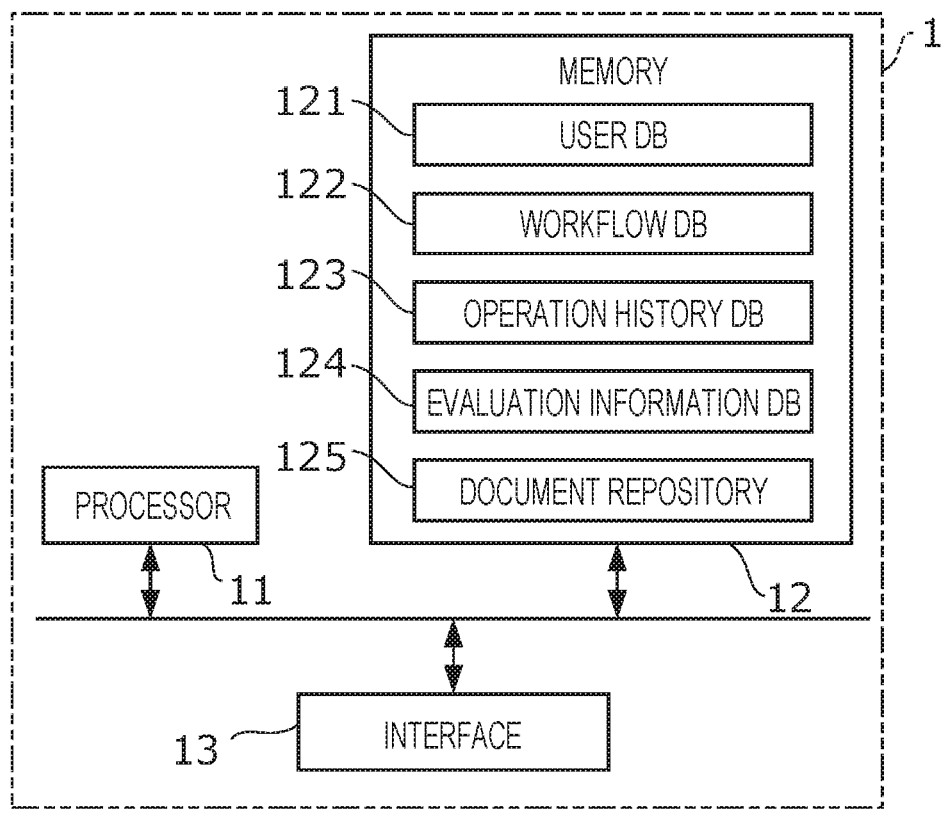
FIG. 2 is a diagram illustrating an exemplary configuration of a notification apparatus.

FIG. 2 is a diagram illustrating an exemplary configuration of the notification apparatus 1. The notification apparatus 1 illustrated in FIG. 2 includes a processor 11, memory 12, and an interface 13. These configurations are connected by, for example, a bus so that they may be able to communicate with each other.

The processor 11 controls each unit of the notification apparatus 1 by reading and executing a computer program (hereinafter simply referred to as a program) stored in the memory 12. The processor 11 is, for example, a central processing unit (CPU).

The interface 13 is a communication circuit that connects the notification apparatus 1 to the terminals 2 via the communication line 3 in a wired or wireless manner so that they may be able to communicate with each other.

The memory 12 is a storage that stores an operating system, various programs, and data loaded by the processor 11. The memory 12 includes random-access memory (RAM) and read-only memory (ROM). Note that the memory 12 may include a solid-state drive or a hard disk drive.

The memory 12 also stores a user DB 121, a workflow DB 122, an operation history DB 123, an evaluation information DB 124, and a document repository 125.

The document repository 125 is an area that stores documents handled by the above-mentioned ECM software and the like. Documents stored in the document repository 125 are documents exchanged in relation to tasks in a company, and include, for example, transportation expenses application forms, estimates, invoices, sales slips, purchase orders, and the like.

Configuration of User DB

FIG. 3 is a diagram illustrating an example of the user DB 121. The user DB 121 is a database that stores, for each user ID which is identification information used to identify a user, information on the user. In the user DB 121 illustrated in FIG. 3, information on a user includes a user name which is the name of the user, a department name which is the name of a department to which the user belongs, a contact address which is the mail address or the like of the user, and the setting indicating whether the user permits information to be provided in the information processing system 9 (hereinafter may also be referred to as a permission to provide information).

Configuration of Workflow DB

Figure 4:
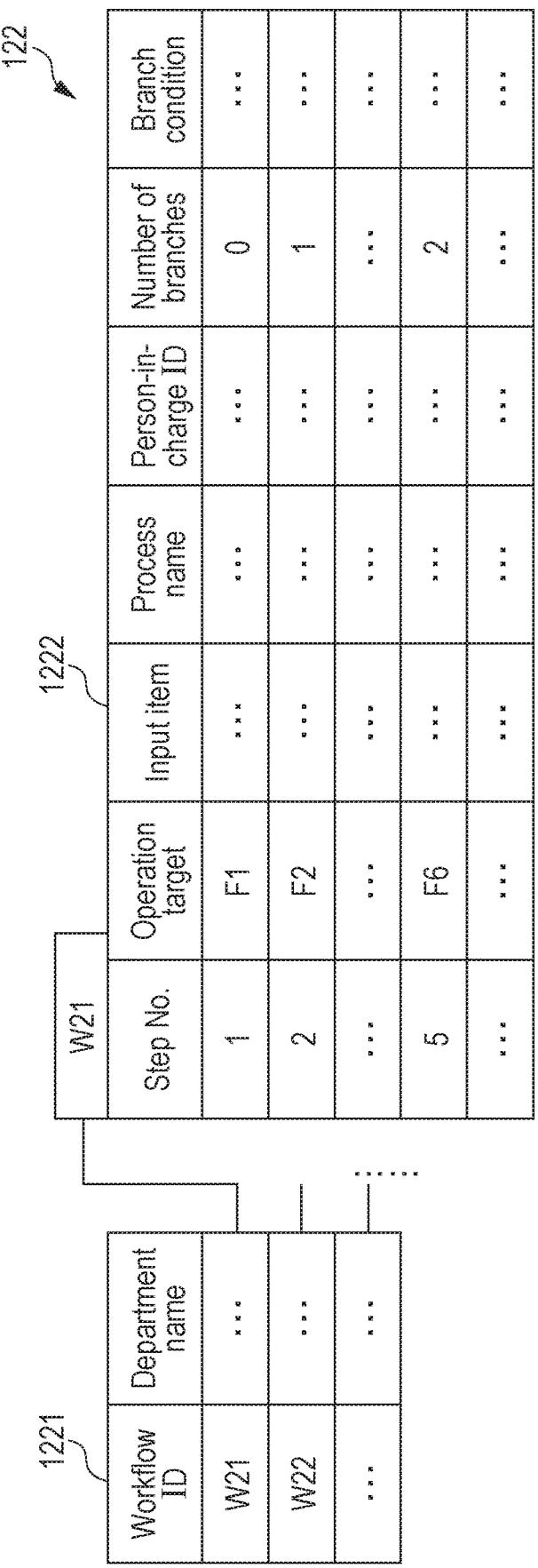
FIG. 4 is a diagram illustrating an exemplary workflow DB.

FIG. 4 is a diagram illustrating an example of the workflow DB 122. The workflow DB 122 is a database that stores, for each workflow handled by the notification apparatus 1, information on the workflow. The term "workflow" here represents a sequential flow of information exchange performed when members who belong to an organization such as a company perform a task.

The workflow DB 122 illustrated in FIG. 4 includes a workflow table 1221 and a step table 1222. The workflow table 1221 is a table for associating a workflow ID which is identification information for identifying a workflow and a department name which is the name of a department that controls the workflow. Each workflow ID included in the workflow table 1221 is associated with one step table 1222.

The step table 1222 is a table that describes information on a plurality of steps constituting a workflow indicated by a corresponding workflow ID. The step table 1222 associates, for each step number indicating the order of steps performed in the above-mentioned workflow, an operation target, an input item, a process name, a person-in-charge ID, the number of branches, and a branch condition in the step.

Here, the term "step" refers to a unit of processing performed sequentially in a workflow. A step includes the following exemplary content: "a member who settles transportation expenses prepares a transportation expenses application form and applies for the transportation expenses", "the member's boss approves the transportation expenses application form received from an employee, and sends the transportation expenses application form with the boss's approval to the manager of a department to which they belong", "the manager approves the received transportation expenses application form and sends the transportation expenses application form with the manager's approval to a person in charge in the accounting department", and "the person in charge in the accounting department checks and settles the received transportation expenses application form, and instructs a bank to make a transfer".

Alternatively, a step may be a unit of operation input by a user on an input form displayed on the terminal 2 by the ECM software. In this case, a step includes the following exemplary content: on an input form for approval of application, the operation of inputting the name of the application; the operation of selecting the type of the application; the operation of inputting the date and time when the target of the application occurred; and the operation of inputting the name of the user who is the applicant.

The operation target in the step is, for example, an input field for receiving an input, on which a focus moves in response to a mouse click or the like on the input form. In addition, the input item in the step is an item received by the above-mentioned input field. In addition, the process name in the step is the name of a process, such as a transportation expenses settling process, performed by the input item. In addition, the person-in-charge ID in the step is the identification information of a user who is in charge of the process. In addition, the number of branches in the step is the number of processes that follow this process. In addition, the branch condition in the step is information indicating, in the case where the process branches according to input data received by the input field, a set of a condition for determining the input data and a process at the branching destination. The case where the process branches is, for example, the case where, because to-be-settled transportation expenses are expensive and exceed a threshold, the settlement additionally requires an executive's approval.

The step table 1222 is used to, for example, identify the features of each of steps constituting a workflow or determine the similarity/dissimilarity between steps.

Configuration of Operation History DB

Figure 5:
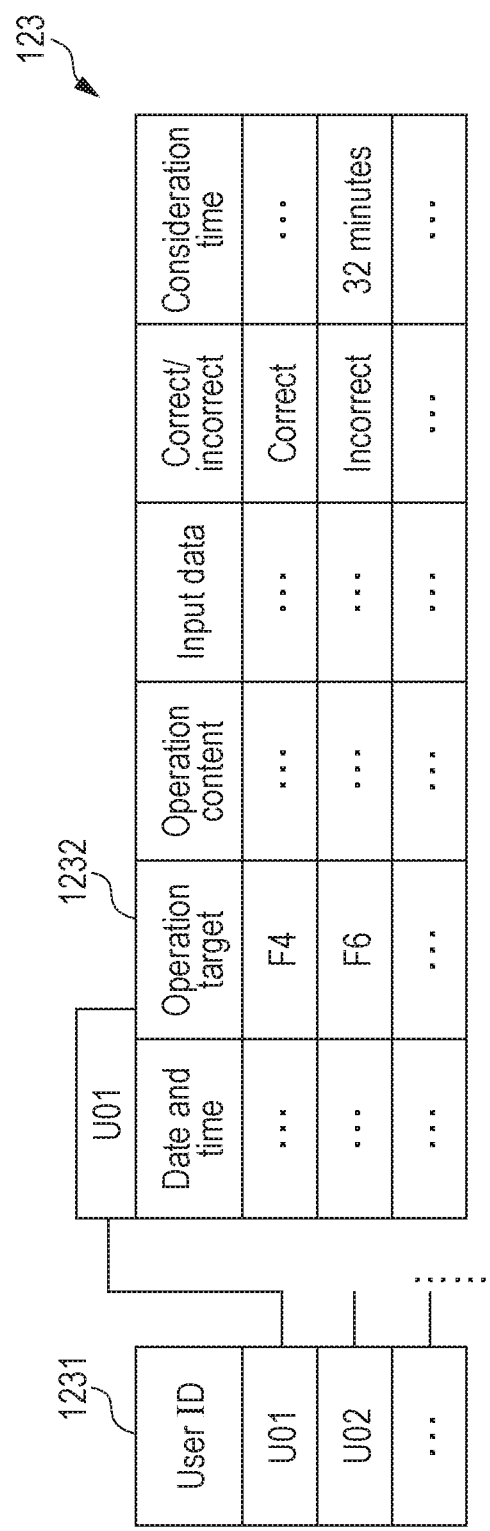
FIG. 5 is a diagram illustrating an exemplary operation history DB.

FIG. 5 is a diagram illustrating an example of the operation history DB 123. The operation history DB 123 is a database that stores the history of a user operating the terminal 2. The notification apparatus 1 receives various requests from the terminals 2 that users respectively operate via the communication line 3. The processor 11 of the notification apparatus 1 detects user operations on the terminals 2 that have generated corresponding requests, and stores information on the operations in the operation history DB 123.

The operation history DB 123 illustrated in FIG. 5 includes a user list 1231 and an operation history table 1232.

The user list 1231 is a list of user IDs which are identification information of users. Each user ID included in the user list 1231 is associated with one operation history table 1232.

The operation history table 1232 is a table that describes operations performed by a user indicated by a corresponding user ID on the terminal 2. The operation history table 1232 associates, for each operation performed by the above-mentioned user, the date and time at which the operation was performed, the operation target indicating the target of the operation, the operation content indicating the content of the operation, input data input in the operation, correctness indicating whether there is an error in the operation, and a consideration time indicating a time spent by the user considering the operation.

Configuration of Evaluation Information DB

Figure 6:
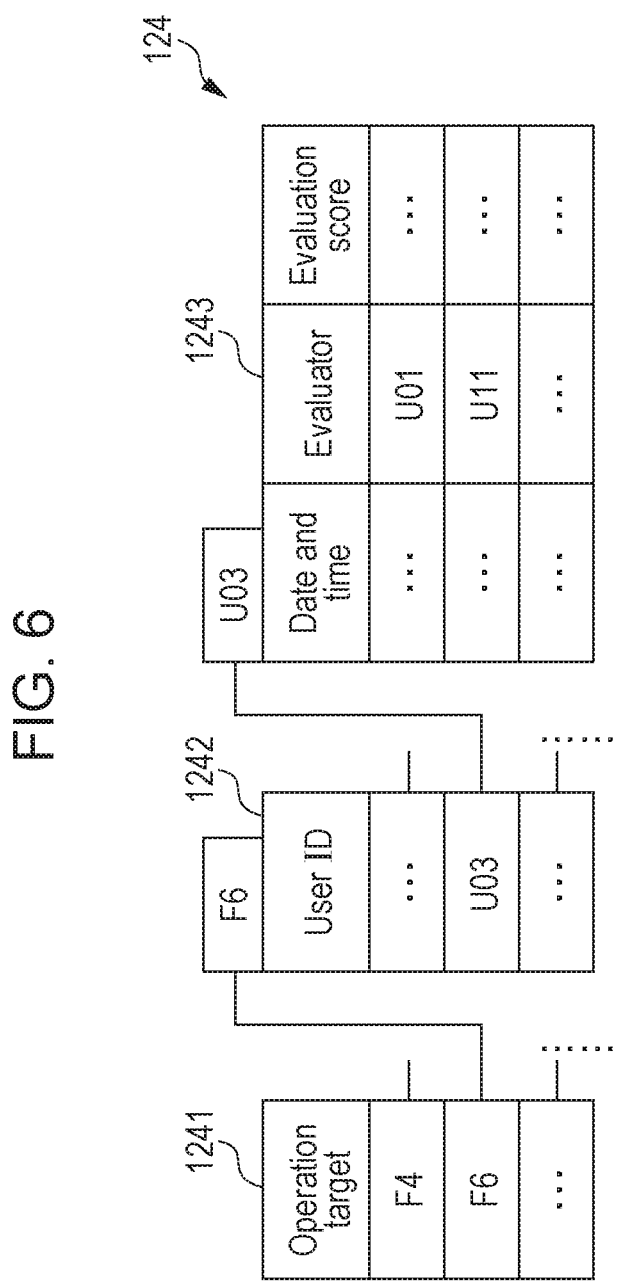
FIG. 6 is a diagram illustrating an exemplary evaluation information DB.

FIG. 6 is a diagram illustrating an example of the evaluation information DB 124. The evaluation information DB 124 is a database that stores an evaluation by a first user of a second user whose information has been given as notice of an expert to the first user. The evaluation information DB 124 includes an operation target list 1241, a user list 1242, and an evaluation table 1243.

The operation target list 1241 is a list of items of identification information of operation targets that are targets of operations where stagnation is detected by first users. Each item of identification information included in the operation target list 1241 is associated with one user list 1242.

The user list 1242 is a list of user IDs of second users whose information has been given as notice of experts of a corresponding operation target to a first user. Each user ID included in the user list 1242 is associated with one evaluation table 1243.

The evaluation table 1243 is a table that describes an evaluation of knowledge about the above-mentioned operation target of a second user identified by a corresponding user ID. The evaluation table 1243 indicates, for each set of an operation target and a second user, the result of an evaluation by a first user who has received explanation of the operation target from the second user, of the second user's explanation. In the evaluation table 1243, the user ID of a first user serving as an evaluator, the date and time at which the first user evaluated the second user, and an evaluation score which is the score of the evaluation are associated with each other. By accumulating the evaluation scores described in the evaluation table 1243, the processor 11 determines the eligibility as an expert of a second user regarding a corresponding operation target.

Configuration of Terminal

Figure 7:
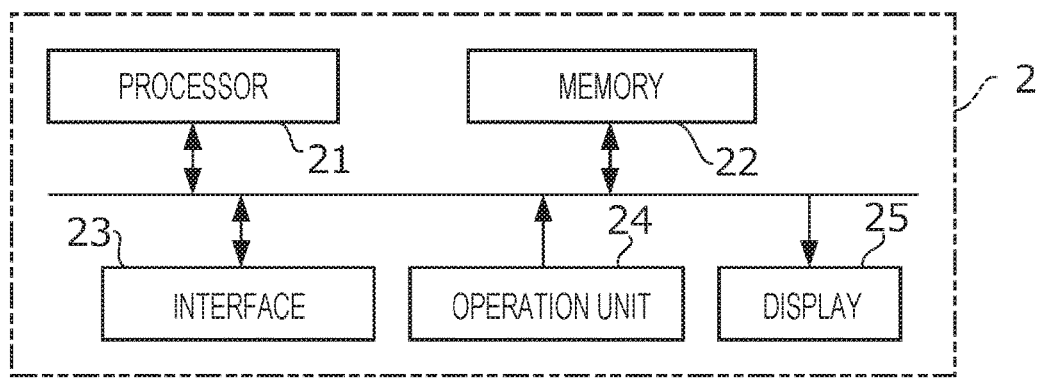
FIG. 7 is a diagram illustrating an exemplary configuration of a terminal.

FIG. 7 is a diagram illustrating an exemplary configuration of the terminal 2. The terminal 2 illustrated in FIG. 7 includes a processor 21, memory 22, an interface 23, an operation unit 24, and a display 25. These configurations are connected by, for example, a bus so that they may be able to communicate with each other.

The processor 21 controls each unit of the terminal 2 by reading and executing a program stored in the memory 22. The processor 21 is, for example, a CPU.

The memory 22 is a storage that stores an operating system, various programs, and data loaded by the processor 21. The memory 22 includes RAM and ROM. Note that the memory 22 may include a solid-state drive or a hard disk drive.

The interface 23 is a communication circuit that connects the terminal 2 to the notification apparatus 1 via the communication line 3 in a wired or wireless manner so that they may be able to communicate with each other.

The operation unit 24 includes operators such as operation buttons, a keyboard, a touchscreen, and a mouse for giving various commands. The operation unit 24 receives an operation and sends a signal in accordance with the operation content to the processor 21. This operation is, for example, pressing on the keyboard or gestures on the touchscreen.

Note that the operation unit 24 may include, for example, an infrared sensor or the like, and may detect whether a user is within a range where the user may operate the terminal 2. The detection result may be used to identify a consideration time spent by the user when performing an operation. For example, a time determined as a time during which the user is not within a range where the user may operate the terminal 2 is a time during which the user is away, and is not a time during which the user is not sure about what operation the user should perform on the terminal 2. Therefore, the notification apparatus 1 which has obtained this information may subtract this time from a consideration time associated with the operation.

The display 25 includes a display screen such as a liquid crystal display, and displays an image under control of the processor 21. A transparent touchscreen of the operation unit 24 may be arranged on the display screen in an overlapping manner.

Functional Configuration of Notification Apparatus

Figure 8:
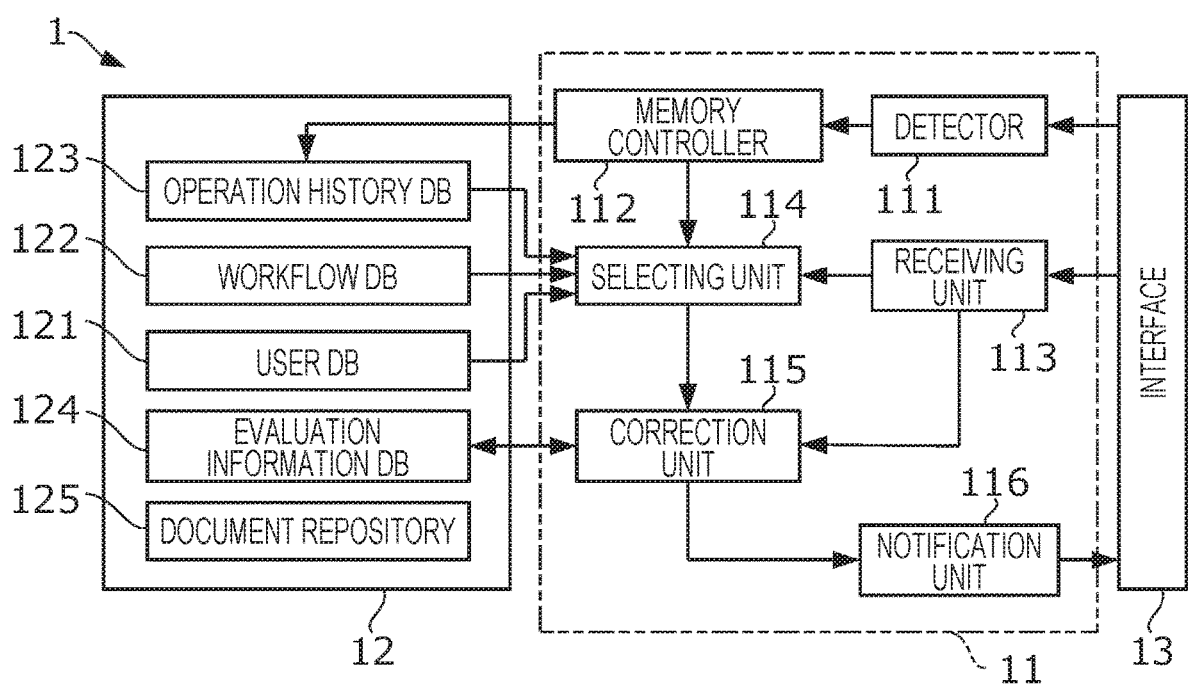
FIG. 8 is a diagram illustrating an exemplary functional configuration of the notification apparatus.

FIG. 8 is a diagram illustrating an exemplary functional configuration of the notification apparatus 1. The processor 11 of the notification apparatus 1 executes a program stored in the memory 12, thereby functioning as a detector 111, a storage controller 112, a receiving unit 113, a selecting unit 114, a correction unit 115, and a notification unit 116.

The detector 111 receives various requests from the terminals 2 via the communication line 3 and the interface 13, and, on the basis of these requests, detects operations that the terminals 2 have received from corresponding users.

The storage controller 112 stores the operations detected by the detector 111 in the operation history DB 123 of the memory 12. That is, the processor 11 functioning as the storage controller 112 is an example of a processor that stores user operations in memory.

The storage controller 112 may store, for example, user operations for each of steps in which the operations are performed.

The receiving unit 113 receives, from a first user, designation of a criterion for selecting a second user. This criterion includes, for example, "prioritize a person whose date and time of use is new", "prioritize a person whose frequency of use is high", "prioritize a person who has made fewer input errors", and "prioritize a person who has spent a shorter input time".

In addition, the receiving unit 113 may receive, in the case where the notification apparatus 1 notifies a first user of information on a second user, an evaluation of the second user by the first user. In short, the processor 11 functioning as the receiving unit 113 is an example of a processor that receives, from a first user who is notified by the notification apparatus 1 of information, evaluation information indicating an evaluation of a second user indicated by the information. This evaluation is stored by the later-described correction unit 115 in the evaluation information DB 124.

In the case where there is an operation that does not satisfy a set condition (hereinafter referred to as a first operation) out of the operations detected by the detector 111, the selecting unit 114 identifies a user who has performed the first operation as a first user.

Here, the first operation is an operation performed when a user does not know what operation the user should do.

When a user does not know what operation the user should do, the user spends a longer time until performing an operation than when the user knows what operation the user should do. In addition, in the case where a user performs a wrong input and the notification apparatus 1 rejects that input, it is highly likely that the user does not know what operation the user should do.

Therefore, in response to detection of an operation that does not satisfy a set condition, such as when a consideration time exceeds a threshold or when an input is rejected because the input is a wrong input, the selecting unit 114 regards this operation as a first operation, and identifies a user who has performed the first operation as a first user. In short, an operation that does not satisfy a set condition is an operation that is stagnant compared to a theoretical case.

For the identified first user, the selecting unit 114 selects a second user who is an expert that should be introduced on the basis of the content of operations stored in the operation history DB 123.

The selecting unit 114 extracts, out of operations stored in the operation history DB 123, for example, an operation whose operation target is common to that of the first operation and which satisfies the above-mentioned condition (hereinafter referred to as a second operation), and selects a user who has performed the second operation as a second user. The selecting unit 114 may select a user whose ratio of performing second operations exceeds a threshold in the operation history DB 123 as a second user.

In short, the processor 11 functioning as the selecting unit 114 is an example of a processor that, in response to detection of a first operation that does not satisfy a set condition, selects a first user who has performed the first operation, and, for the first user, selects a second user who has performed a second operation satisfying the above-mentioned condition from among operations stored in memory.

Note that the selecting unit 114 may refer to the user DB 121 and exclude a user whose permission to provide information has been set to "no" (that is, a user who does not permit to provide information) from targets from which a second user is selected.

In addition, a condition for determining whether an operation is a second operation (hereinafter referred to as a second condition) may be common to or different from a condition for determining whether an operation is a first operation (hereinafter referred to as a first condition). A second operation satisfying a second condition may at least be an operation satisfying a first condition.

In addition, in the case where the receiving unit 113 has received designation of a criterion used for selection, the selecting unit 114 selects a second user on the basis of the designated criterion. In short, the processor 11 functioning as the selecting unit 114 is an example of a processor that selects, out of a plurality of users who have performed a second operation, a second user on the basis of a criterion designated by a first user.

In addition, the selecting unit 114 is not limited to extracting, out of operations stored in the operation history DB 123, a second operation from operations whose operation targets are common to that of a first operation. For example, in the case where the storage controller 112 stores user operations for each of steps in which the operations are performed, the selecting unit 114 may extract, out of operations stored in the operation history DB 123, a second operation satisfying the above-mentioned condition from operations whose steps are common or similar to those of a first operation.

In the case of extracting a second operation from operations performed in similar steps, the processor 11 functioning as the selecting unit 114 is an example of a processor that, in response to detection of a first operation, selects a second user who has performed a second operation in a second step similar to a first step in which the first operation has been performed.

As has been described above, when the receiving unit 113 receives an evaluation of a second user by a first user, the correction unit 115 stores the evaluation in the evaluation information DB 124. When the selecting unit 114 selects a second user, if evaluation information indicating an evaluation of the second user is stored in the evaluation information DB 124, the correction unit 115 may correct the to-be-selected second user in accordance with the evaluation information. In this case, the processor 11 functioning as the selecting unit 114 and the correction unit 115 is an example of a processor that selects, out of a plurality of users who have performed a second operation, a second user selected in accordance with evaluation information.

The notification unit 116 notifies a first user of information on a second user selected by the selecting unit 114 or a second user corrected by the correction unit 115 after the selection.

Operation of Notification Apparatus

Figure 9:
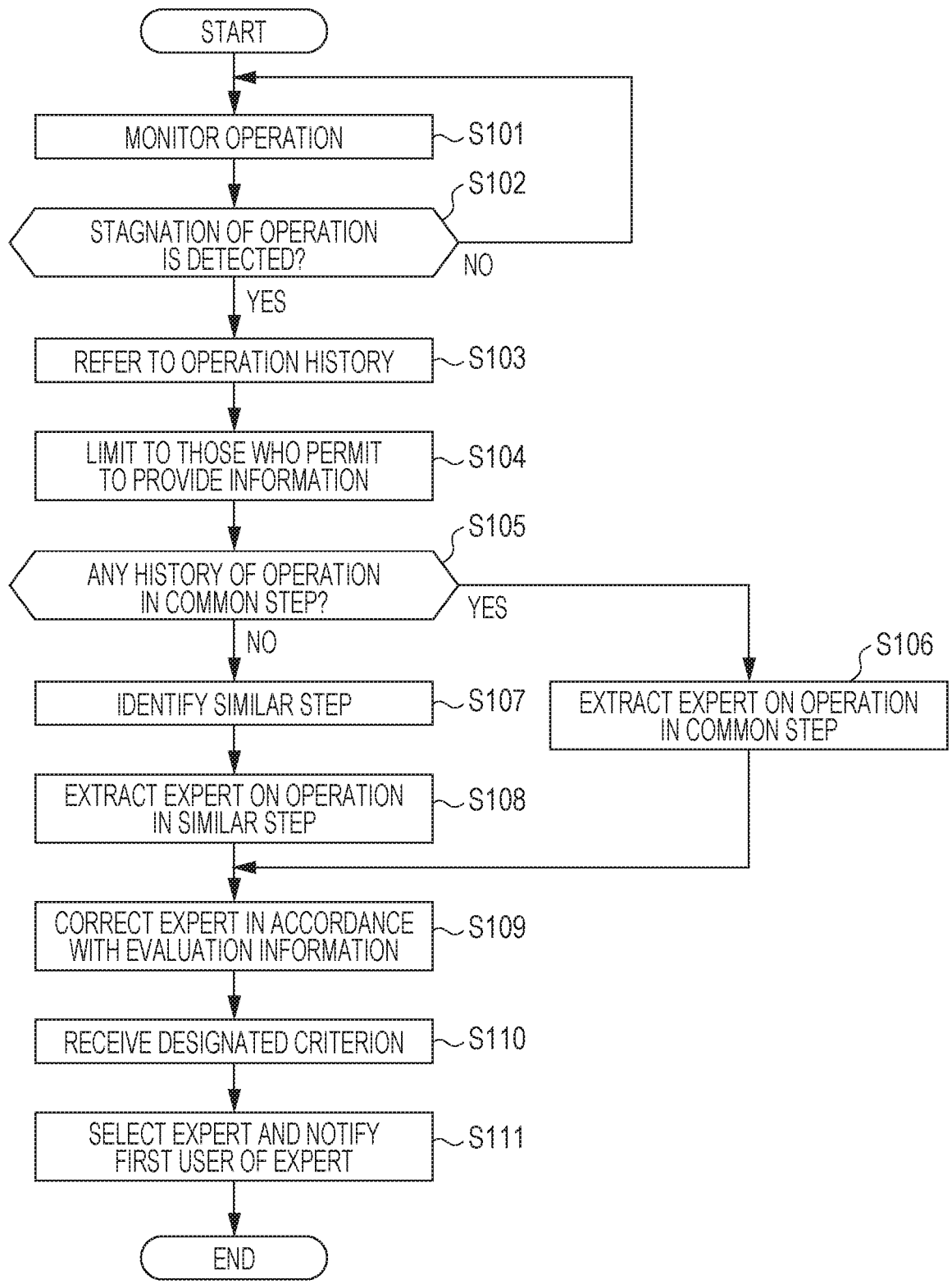
FIG. 9 is a flowchart illustrating an exemplary flow of the operation of giving notice of information on a second user by the notification apparatus.

FIG. 9 is a flowchart illustrating an exemplary flow of the operation of giving notice of information on a second user by the notification apparatus 1. The processor 11 of the notification apparatus 1 monitors, on the basis of a request sent from a terminal 2, an operation performed by a user who owns the terminal 2 (step S101). The processor 11 determines whether stagnation of operation is detected by determining whether an operation being monitored satisfies a set condition (step S102).

FIG. 10 is a diagram illustrating an exemplary input form displayed on the terminal 2 by ECM software. The input form illustrated in FIG. 10 includes the title "Application approval processing system" and a plurality of input fields. An input field F1 is a field for inputting the name of the application.

An input field F2 is a field for selecting the type of the application from a so-called pull down menu. An input field F3 is a field for inputting the date at which expenses being applied were incurred. An input field F4 is a field for inputting the name of the applicant. An input field F5 is a field for inputting an application code which is a code assigned to the application. This input field F5 is linked with the input field F2 and is set along with an input in the input field F2.

An input field F6 is a field for inputting a cost code which is a code assigned to a cost into which the expenses being applied are classified. An input field F7 is a field for inputting a PJ code which is the code of a project done by the expenses being applied. An input field F8 is a field for inputting an application destination which is the destination of the application, or an approver who approves the application.

The processor 11 monitors operations on these input fields and determines whether stagnation of operation is detected by determining whether a set condition is satisfied. When, for example, an operation being monitored is performed after a consideration time exceeding a threshold or when an operation being monitored is wrong and is rejected by the notification apparatus 1, the processor 11 regards this as a first operation.

As illustrated in FIG. 9, in the case where it is determined that stagnation of operation is not detected (NO in step S102), the processor 11 brings the process back to step S101.

In contrast, in the case where it is determined that stagnation of operation is detected (YES in step S102), the processor 11 refers to the operation history DB 123 stored in the memory 12 (step S103), and limits targets from which a second user is selected to users who permit to provide information (step S104).

For example, an operation on the input field F6 illustrated in FIG. 10 is performed after a consideration time exceeding a threshold, or is wrong. As a result, the processor 11 identifies this operation on the input field F6 as a first operation causing stagnation.

The processor 11 determines whether the operation history DB 123 includes a history of operation in a step common to a step in which an operation where stagnation is detected, that is, a first operation, has been performed (step S105).

In the case where it is determined that the operation history DB 123 includes a history of operation in the above-mentioned common step (YES in step S105), the processor 11 extracts a second operation satisfying a set condition from the operation history in the common step, and, on the basis of this, extracts a second user who has performed the second operation as an expert on the step (step S106).

In contrast, in the case where it is determined that the operation history DB 123 does not include a history of operation in a step common to a step in which the first operation has been performed (NO in step S105), the processor 11 identifies a step similar to a step in which the first operation has been performed (hereinafter may also be referred to as a similar step) (step S107). At this time, the processor 11 refers to, for example, the step table 1222 in the workflow DB 122 and determines the similarity of each step included in the workflow, thereby identifying the above-mentioned similar step. The processor 11 extracts the above-mentioned second operation from an operation history in the similar step, and, on the basis of this, extracts a second user who has performed the second operation as an expert on the step (step S108).

If evaluation information indicating an evaluation of the extracted second user is stored in the evaluation information DB 124, the processor 11 corrects the second user in accordance with the evaluation information (step S109).

In addition, the processor 11 receives a criterion designated by the first user who has performed the above-mentioned first operation via the terminal 2 (hereinafter may also be referred to as a designated criterion) (step S110), selects a second user who is an expert according to the designated criterion, and notifies the first user of the second user (step S111).

FIG. 11 is a diagram illustrating an exemplary input form that gives notice of information on the second user. At the terminal 2 of the first user, a criterion designated by the first user is stored in advance in the memory 22. The processor 11 of the notification apparatus 1 receives the designated criterion from the terminal 2.

For example, in the case where the designated criterion stored in the memory 22 is "prioritize a person whose date and time of use is new", the notification apparatus 1 instructs the terminal 2 to, as illustrated in FIG. 11, display a message area M overlapping the input field F6, which is the target of the stagnated first operation. This message area M is an area including the text "Are you having trouble with the cost code? Recently, YYY in the XXX department has submitted an application with a similar name. mail: yyyy@\*\*\*\*\*\*\*.co.jp".

With the above-described operation, the information processing system 9 introduces, to a first user who does not know what operation the first user should do, a second user who has knowledge about the operation by giving notice of information on the second user, such as the second user's name, the name of a department to which the second user belongs, and the second user's contact address. Accordingly, when a first user does not know what operation the first user should do, the first user will know a second user to be consulted without separately performing an active operation such as a search.

In addition, in the case where the notification apparatus 1 receives a designated criterion from a first user, if the first user knows that, for example, the company rules have changed, the first user may select a second user who has performed an operation after the change rather than a second user who is highly evaluated before the change.

In addition, in the case where the notification apparatus 1 regards not only a user who has performed a step common to a step in which a first operation causing stagnation has been performed, but also a user who has performed an operation in a similar step as targets from which a second user is selected, even if a first user has trouble with an operation in a new step, if there is a similar step, the first user may find a second user to be consulted.

In addition, when the notification apparatus 1 receives an evaluation of a second user from a first user who has been notified of information on the second user, the second user is selected on the basis of that evaluation from the next time, and notice of information thereof is given. For example, even if the first user contacts the second user whose notice has been given and is actually taught what to do about the stagnated operation, the first user may still not know how to perform that operation. According to the information processing system 9, even if a person is good at operations and has various kinds of knowledge, if that person is not good at teaching the content thereof to others, the person is less likely to be introduced as an expert because of the person's evaluations by those who have been taught by the person.

Modifications

So far is the description of the exemplary embodiment. Now, the content of the exemplary embodiment may be modified as follows. In addition, the following modifications may be combined.

First Modification

Although the information processing system 9 in the above-described exemplary embodiment notifies a user what to do by serving as a so-called client-server system in which the notification apparatus 1 and the terminals 2 are connected to each other, this may be performed using one apparatus. In this case, for example, the notification apparatus 1 may include configurations corresponding to the operation unit 24 and the display 25 included in each terminal 2. Simply, a user may directly operate the notification apparatus 1 to check the displayed content.

Second Modification

Although the processor 11 of the notification apparatus 1 gives notice of information on a second user who has performed a second operation satisfying a set condition in the above-described exemplary embodiment, a user who has a set relationship with a first user may be selected as a second user from users who have performed a second operation, and notice of information on the selected second user may be given. In short, the processor 11 in this modification is an example of a processor that gives notice of information on, out of a plurality of users who have performed a second operation, a second user who has a set relationship with a first user.

FIGS. 12A to 12D are diagrams each illustrating an exemplary message area displayed on the input form. A message area Ma illustrated in FIG. 12A indicates the text "Are you having trouble with the cost code? Let me introduce YYY belonging to the same XXX department as you. mail: yyyy@\*\*\*\*\*\*\*.co.jp". The processor 11 of the notification apparatus 1 instructs the terminal 2 to display the message area Ma, thereby giving notice of information on, out of experts, a second user who belongs to the same department as the first user.

Even if a user has deep knowledge about operations, it may be mentally stressful to ask a user in a different department or of a different generation about the operation method. In some cases, it may be difficult to ask a user a question because a department or an office building where the user is may be physically far away. In the information processing system 9 according to this modification, for example, a first user is introduced to an employee in the same department or of the same generation rather than to an employee in a different department or of a different generation. In addition, for example, a first user is introduced to an employee working in the same office building or on the same floor rather than to an employee working in a different office building or on a different floor.

In short, according to this modification, a first user is notified of an expert to whom it is easier to ask questions.
Third Modification Although the processor 11 of the notification apparatus 1 notifies the first user of information on the second user, such as the name and the contact address, in the above-described exemplary embodiment, the content to be notified is not limited to the above information. For example, the processor 11 may give notice of operation information indicating a second operation performed by a second user. In short, the processor 11 in this modification is an example of a processor that gives notice of identification information for identifying a second user and operation information indicating a second operation performed by the second user.

For example, a message area Mb illustrated in FIG. 12B indicates the text "Are you having trouble with the cost code? Previously YYY entered the following codes: 123-456/456-123". The processor 11 of the notification apparatus 1 instructs the terminal 2 to display the message area Mb, thereby notifying the first user of operation information indicating a second operation.

Since the first user is directly notified of the second operation itself in this modification, the first user need not to, for example, ask the second user about the correct operation procedure or the like.
Fourth Modification Although the processor 11 of the notification apparatus 1 gives notice of information on one second user in the above-described exemplary embodiment, the processor 11 may give notice of information on a plurality of second users. In addition, in the case where there are multiple correct inputs and experts thereof, the processor 11 may give notice of information including these circumstances.

For example, a message area Mc illustrated in FIG. 12C indicates the text "Are you having trouble with the next process? It seems that, from the past execution history, the implementation content differs depending on the application content. Let me introduce operators with a shot input time. Long distance application: DDDD in AAA department/ Nearby application: EEEE in BBB department". The processor 11 of the notification apparatus 1 instructs the terminal 2 to display the message area Mc, thereby notifying the first user of information on second users that are different depending on conditions.
Fifth Modification Although the processor 11 of the notification apparatus 1 selects a second user in accordance with the designated criterion "prioritize a person whose date and time of use is new" in the above-described exemplary embodiment, the designated criterion is not limited to this criterion. For example, on receipt of the designated criterion "prioritize a person who has made fewer input errors", the processor 11 may instruct the terminal 2 to display a message area Md illustrated in FIG. 12D. The message area Md indicates the text "Due to typos in the PJ code, applications have been frequently returned. Let me introduce a user whose applications have been returned only a few times. CCCC in AAA department".

In short, by changing the designated criterion, the first user may be notified of information on an expert who has performed excellent operations from various viewpoints.
Sixth Modification Although the processor 11 of the notification apparatus 1 receives the designated criterion stored in advance in the memory 22 from the terminal 2 in the above-described exemplary embodiment and modifications, the processor 11 may inquire the first user who is operating the terminal 2 about the designated criterion, and receive a response to the inquiry.

Figure 13:
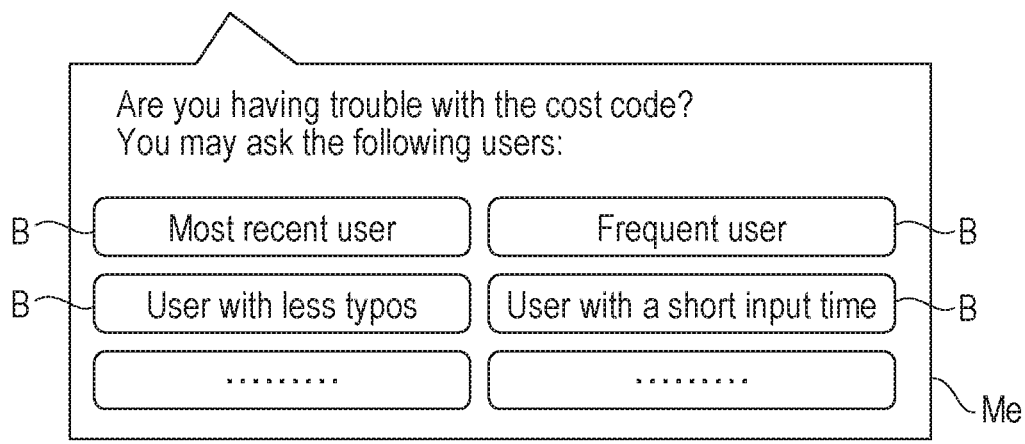
FIG. 13 is a diagram illustrating an exemplary message area for inquiring a first user about a designated criterion.

FIG. 13 is a diagram illustrating an exemplary message area for inquiring the first user about the designated criterion. A message area Me illustrated in FIG. 13 indicates the text "Are you having trouble with the cost code? You may ask the following users:". The message area Me includes a plurality of buttons B subsequent to the above-described text. By clicking any of these buttons B, the first user may designate the above-described criterion.

Figure 14:
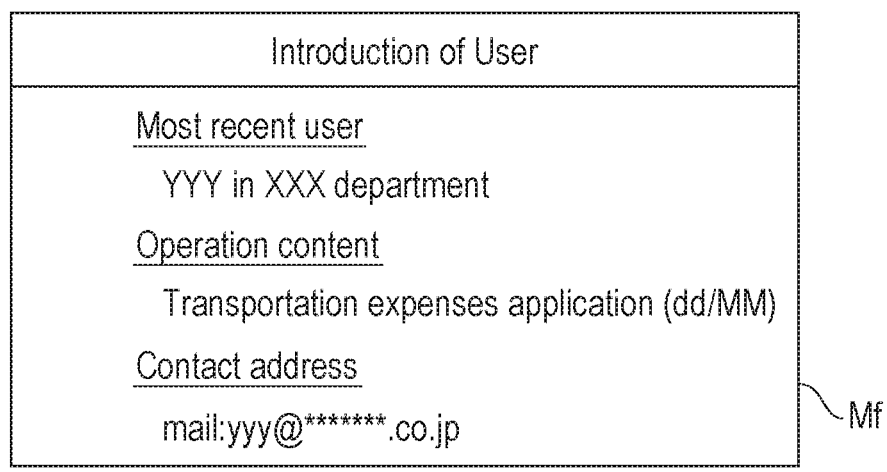
FIG. 14 is a diagram illustrating an exemplary message area displayed in accordance with the designated criterion indicated by a response to the inquiry.

FIG. 14 is a diagram illustrating an exemplary message area displayed in accordance with the designated criterion indicated by a response to the inquiry. In the case where the first user clicks the button B indicating, for example, the text "Most recent user" in the message area Me illustrated in FIG. 13, the designated criterion prioritizes a person whose date and time of use is new. At this time, a message area Mf displayed in accordance with the designated criterion gives notice of, as information on the most recent user as illustrated in FIG. 14, the name "YYY in XXX department", the operation content "Transportation expenses application (dd/MM)", and the contact address "mail: yyyy@\*\*\*\*\*\*\*.co.jp".
Seventh Modification Although the processor 11 of the notification apparatus 1 notifies the first user of information on the second user in the above-described exemplary embodiment and modifications, the processor 11 may notify the second user of information on the first user. In short, the processor 11 in this modification is an example of a processor that stores user operations in memory, and, in response to detection of a first operation that does not satisfy a set condition, notifies a second user who has performed a second operation satisfying the condition, from among the operations stored in the memory, of information on a first user who has performed the first operation.

Figure 15:
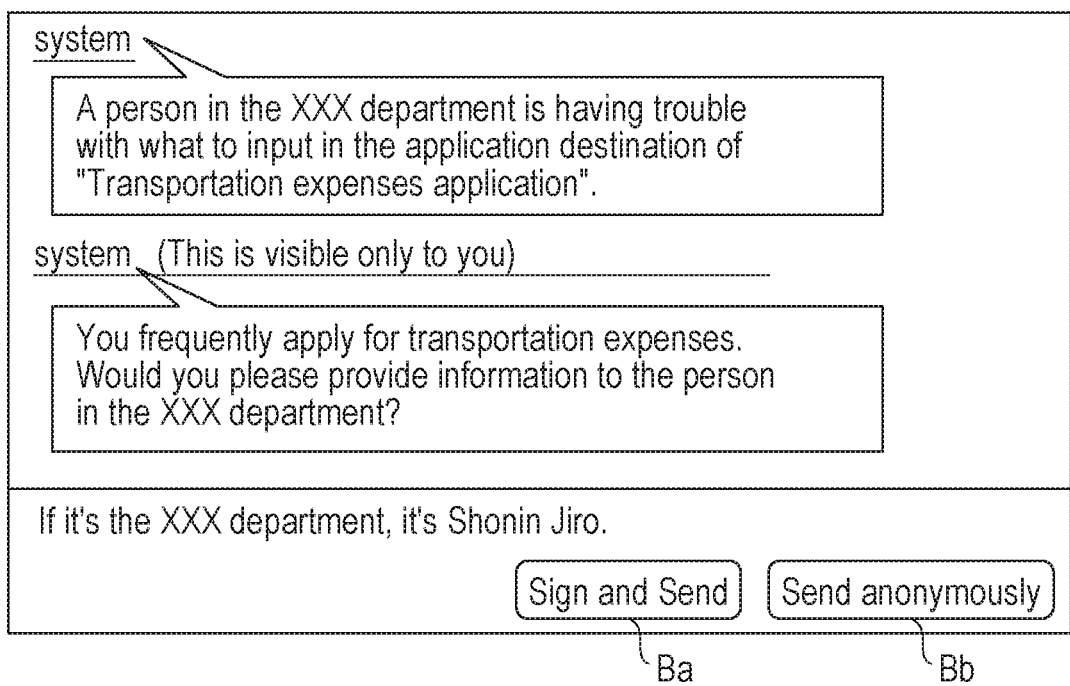
FIG. 15 is a diagram illustrating an exemplary chat window that notifies a second user of information on a first user.

FIG. 15 is a diagram illustrating an exemplary chat window that notifies a second user of information on a first user. In response to detection of a first operation, the processor 11 selects a second user who may be able to give a useful advice to a first user who has performed the first operation. The processor 11 instructs a terminal 2 owned by the selected second user to display a chat window C1 illustrated in FIG. 15. The chat window C1 indicates, as notice from the system, the text "A person in the XXX department is having trouble with what to input in the application destination of 'Transportation expenses application'". Subsequent to the above-described text, the chat window C1 indicates the text "It seems that you frequently apply for transportation expenses. Would you please provide information to the person in the XXX department?", which is notice that is only visible to the second user.

Seeing this text, the second user types text indicating the advice "If it's the XXX department, it's Shonin Jiro." in an entry field arranged at the bottom of the chat window C1, and clicks one of a button Ba indicated as "Sign and Send" and a button Bb indicated as "Send anonymously".

Figure 16:
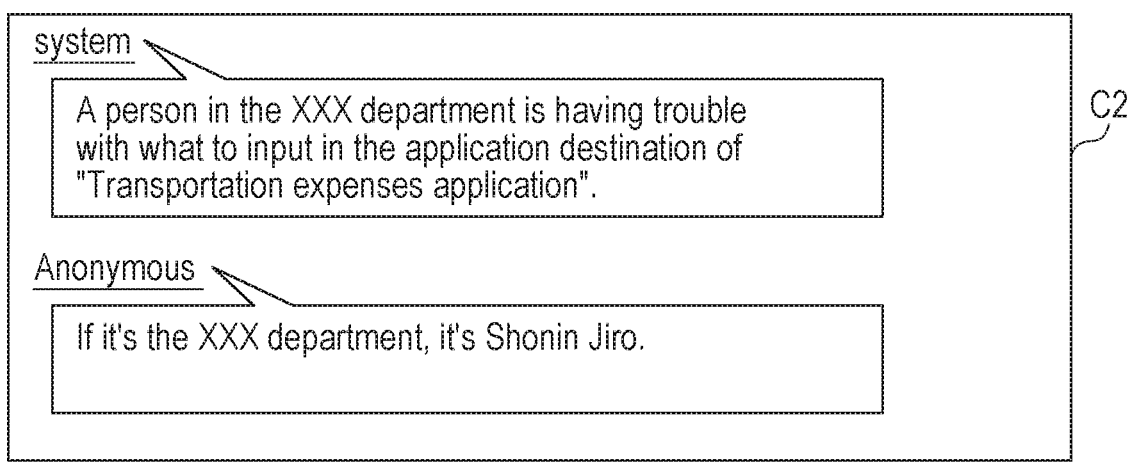
FIG. 16 is a diagram illustrating an exemplary chat window seen by the first user.

FIG. 16 is a diagram illustrating an exemplary chat window seen by the first user. In the case where the second user enters text indicating the above-mentioned advice and clicks the button Bb on the chat window C1 illustrated in FIG. 15, the terminal 2 of the first user displays a chat window C2 illustrated in FIG. 16. With this chat window C2, the first user is notified of the text indicating the advice entered by the second user, which serves as an anonymous post.

According to this modification, for example, the notice "There is a person having trouble" may be sent to multiple second users. Note that information on a first user who does not know what operation the first user should do is not limited to the name, and, for example, information on a first user may simply be the information "There is a first user".

Eighth Modification

Although the processor 11 of the notification apparatus 1 gives notice of information on a second user who has performed a second operation satisfying a set condition in the above-described exemplary embodiment, the information to be notified is not limited to the above. The processor 11 may notify, for example, another user who is performing an operation in the same step of information on the first user. In short, the processor 11 in this modification is an example of a processor that stores user operations in memory, and, in response to detection of a first operation that does not satisfy a set condition, notifies another user who is performing an operation in a first step in which the first operation has been performed of information on a first user who has performed the first operation.

According to this modification, the first user may obtain useful information from another user who is performing an operation in a common step at the same time. Another user who is performing an operation at the same time may not be a so-called expert; however, the problem may be solved by collecting pieces of information that each user knows.

Ninth Modification

Although the above-described notification apparatus 1 includes the processor 11 including a CPU, a controller that controls the notification apparatus 1 may be other configurations. For example, the notification apparatus 1 may include various processors other than a CPU.

Here, the processor refers to a processor in a broad sense, and includes general processors (such as the above-mentioned CPU) and dedicated processors (such as a graphics processing unit (GPU), an application specific integrated circuit (ASIC), a field programmable gate array (FPGA), and a programmable logic device).

Tenth Modification

The operation of the processor 11 in the above-described exemplary embodiment may be implemented not only by one processor 11, but by plural processors in collaboration which are located physically apart from each other but may work cooperatively. For example, the processor 21 of the above-mentioned terminal 2 may serve as at least some of the functions of the above-mentioned processor 11.

The order of operations of the processor is not limited to one described in the exemplary embodiment above, and may be changed as appropriate.

Eleventh Modification

Programs executed by the processor 11 of the above-mentioned notification apparatus 1 are examples of a program for causing a computer including memory to execute a process including: storing user operations in the memory; and, in response to detection of a first operation that does not satisfy a set condition, notifying a first user who has performed the first operation of information on a second user who has performed a second operation satisfying the condition, from among the operations stored in the memory.

These programs may be provided in a state where the programs are recorded on a computer-readable recording medium such as a magnetic recording medium including a magnetic tape and a magnetic disk, an optical recording medium including an optical disk, a magneto-optical recording medium, and semiconductor memory. In addition, the programs may be downloaded via a communication line such as the Internet.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiment and with the various modifications as are suited to the particular use contemplated. It is intended that the scope of the disclosure be defined by the following claims and their equivalents.

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiments above, and may be changed.

What is claimed is:

1. A notification apparatus for notifying users of available experts, the notification apparatus, comprising:
   a memory; and
   a processor that:
   stores, using a storage controller, history of user operations in a history database in the memory,
   detects, using a detector, a first operation performed by a first user exceeding a predetermined threshold time as a detection of the first operation that does not satisfy a condition,
   in response to the detection of the first operation that does not satisfy the condition, refers to the history database, in response to determining that the history database does not include a history of operation in a step common to a step in which the first operation has been performed, identifies a step similar to the step in which the first operation has been performed by referring to a step table in a workflow database to determine a similarity of each step, extracts a user who has performed a second operation as a second user being an expert on the step similar to the step in which the first operation has being performed, and notify, using a notification unit, the first user of information of the second user who has performed the second operation satisfying the condition, based on the history stored in the history database, wherein the second operation performed by the second user is an operation whose operation target is common to the first operation performed by the first user.

2. The notification apparatus according to claim 1, wherein the processor is configured to select, from among a plurality of users who have performed the second operation, one or more users according to a criterion designated by the first user, and wherein the notification to the first user includes information on the selected one or more users as the information on the second user.

3. The notification apparatus according to claim 2, wherein the processor is configured to select, from among a plurality of users who have performed the second operation, one or more users who is in a certain relationship with the first user, and wherein the notification to the first user includes information on the selected one or more second users as the information on the second user.

4. The notification apparatus according to claim 3, wherein the notification to the first user includes identification information of the second user and operation information indicating the second operation performed by the second user.

5. The notification apparatus according to claim, 2, wherein the processor is configured to select, from among a plurality of users who have performed the second operation, one or more users who is in a certain relationship with the first user, and wherein the notification to the first user includes information on the selected one or more second users as the information on the second user.

6. The notification apparatus according to claim 5, wherein the notification to the first user includes identification information of the second user and operation information indicating the second operation performed by the second user.

7. The notification apparatus according to claim 2, wherein the processor is configured to select, from among a plurality of users who have performed the second operation, one or more users who is in a certain relationship with the first user, and wherein the notification to the first user includes information on the selected one or more second users as the information on the second user.

8. The notification apparatus according to claim 7, wherein the notification to the first user includes identification information of the second user and operation information indicating the second operation performed by the second user.

9. The notification apparatus according to claim 2, wherein the notification to the first user includes identification information of the second user and operation information indicating the second operation performed by the second user.

10. The notification apparatus according to claim 1, wherein the processor is configured to select, from among a plurality of users who have performed the second operation, one or more users who is in a certain relationship with the first user, and wherein the notification to the first user includes information on the selected one or more second users as the information on the second user.

11. The notification apparatus according to claim 10, wherein the notification to the first user includes identification information of the second user and operation information indicating the second operation performed by the second user.

12. The notification apparatus according to claim 1, wherein the notification to the first user includes identification information of the second user and operation information indicating the second operation performed by the second user.

13. The notification apparatus according to claim 1, wherein the notification to the first user includes identification information of the second user and operation information indicating the second operation performed by the second user.

14. The notification apparatus according to claim 1, wherein the notification to the first user includes identification information of the second user and operation information indicating the second operation performed by the second user.

15. The notification apparatus according to claim 1, wherein the processor is configured to receive an evaluation of the second user from the first user who has been notified of the information on the second user, wherein the evaluation is used to select one or more users from among a plurality of users who have performed the second operation, and wherein the processor is configured to notify a third user who has performed the first operation that does not satisfy the condition, of information on the selected one or more users.

16. A notification apparatus for notifying users of available experts, the notification apparatus comprising:

a memory; and processing means for storing history of user operations in a history database in the memory, detecting that a first operation performed by a first user exceeding a predetermined threshold time as a detection of the first operation that does not satisfy a condition, in response to the detection of the first operation that does not satisfy the condition, referring to the history database, in response to determining that the history database does not include a history of operation in a step common to a step in which the first operation has been performed, identifying a step similar to the step in which the first operation has been performed by referring to a step table in a workflow database to determine a similarity of each step, extracting a user who has performed a second operation as a second user being an expert on the step similar to the step in which the first operation has being performed, and notifying the first user of information of the second user who has performed the second operation satisfying the condition, based on the history stored in the history database, wherein the second operation performed by the second user is an operation whose operation target is common comment to the first operation performed by the first user.

17. A notification apparatus for notifying users of available experts, the notification apparatus, comprising:
a memory; and
a processor that:
stores, using a storage controller, history of user operations in a history database in the memory,
detects, using a detector, that a first operation performed by a first user exceeding a predetermined threshold time as a detection of the first operation that does not satisfy a condition, and
in response to the detection of the first operation that does not satisfy the condition, refers to the history database,
in response to determining that the history database does not include a history of operation in a step common to a step in which the first operation has been performed, identifies a step similar to the step in which the first operation has been performed by referring to a step table in a workflow database to determine a similarity of each step,
extracts a user who has performed a second operation as a second user being an expert on the step similar to the step in which the first operation has being performed, and
notify, using a notification unit, the second user who who has performed the second operation in a first step in which the first operation has been performed of information on the first user, wherein the second operation performed by the second user is an operation whose operation target is common to the first operation performed by the first user.

18. A non-transitory computer readable medium storing a program causing a computer including a memory to execute a process, the process comprising:
storing, using a storage controller, history of user operations in a history database in the memory;
detecting, using a detector, that a first operation performed by a first user exceeding a predetermined threshold time as a detection of the first operation that does not satisfy a condition;
in response to the detection of the first operation that does not satisfy the condition, referring to the history database,
in response to determining that the history database does not include a history of operation in a step common to a step in which the first operation has been performed, identifying a step similar to the step in which the first operation has been performed by referring to a step table in a workflow database to determine a similarity of each step,
extracting a user who has performed a second operation as a second user being an expert on the step similar to the step in which the first operation has being performed, and
notifying the first user of information of the second user who has performed the second operation satisfying the condition, based on the history stored in the history database, wherein the second operation performed by the second user is an operation whose operation target is common to the first operation performed by the first user.

\* \* \* \* \*